(12) United States Patent
Sun et al.

(10) Patent No.: US 10,081,061 B2
(45) Date of Patent: Sep. 25, 2018

(54) ALUMINUM WHEEL BURR REMOVING MACHINE

(71) Applicant: Qinhuangdao Xinyue Intelligent Equipment Co., Ltd, Qinhuangdao (CN)

(72) Inventors: Yan Sun, Qinhuangdao (CN); Fuqiang Li, Qinhuangdao (CN); Shuangyong Liu, Qinhuangdao (CN); Shaojiang Wang, Qinhuangdao (CN); Yonggang Zhao, Qinhuangdao (CN); Lijie Song, Qinhuangdao (CN); Xu Hou, Qinhuangdao (CN); Guoxin Xiao, Qinhuangdao (CN); Fanbo Meng, Qinhuangdao (CN); Yanchao Ren, Qinhuangdao (CN)

(73) Assignee: Qinhuangdao Xinyue Intelligent Equipment Co., LTD (CN)

( * ) Notice: Subject to any disclaimer, the term of this patent is extended or adjusted under 35 U.S.C. 154(b) by 0 days.

(21) Appl. No.: 15/423,634

(22) Filed: Feb. 3, 2017

(65) Prior Publication Data

US 2018/0071828 A1    Mar. 15, 2018

(30) Foreign Application Priority Data

Sep. 13, 2016    (CN) .......................... 2016 1 0818519

(51) Int. Cl.
*B23B 3/30* (2006.01)
*B23B 5/28* (2006.01)
(Continued)

(52) U.S. Cl.
CPC ............... *B23B 5/28* (2013.01); *B23D 79/02* (2013.01); *B23B 2215/08* (2013.01);
(Continued)

(58) Field of Classification Search
CPC ... B23D 79/02; B23B 5/2215; B23B 2220/08; B23B 5/28; B23B 29/12; B23B 2215/08; B23B 2222/04; B24B 9/00; B24B 9/04
See application file for complete search history.

(56) References Cited

U.S. PATENT DOCUMENTS

| 493,738 A | * | 3/1893 | Streit | ........................ B23B 5/40 |
| | | | | 451/143 |
| 521,353 A | * | 6/1894 | Wood | ........................ B23B 5/40 |
| | | | | 82/103 |

(Continued)

*Primary Examiner* — Sara Addisu
(74) *Attorney, Agent, or Firm* — Calfee, Halter & Griswold LLP (57) ABSTRACT

The present invention provides an aluminum wheel burr removing machine which includes a roller bed device (1), a positioning and rotating device (2) and a knife box device (3). A wheel (4) is conveyed to a specified position by the roller bed device (1), the positioning and rotating mechanism (2) clamps and rotates the wheel (4), the knife box device (3) horizontally feeds to cut burrs of the wheel (4), the roller bed device (1) conveys the wheel to next station, meanwhile, next wheel enters the roller bed device (1), and next cutting cycle is carried out. The machining time of the present invention is 25-30 seconds, so that the manpower cost is reduced, the machining efficiency is improved, and positive effects are achieved in hub burr removal.

1 Claim, 6 Drawing Sheets

(51) Int. Cl.
*B23D 79/02* (2006.01)
*B24B 9/04* (2006.01)

(52) U.S. Cl.
CPC ....... *B23B 2220/08* (2013.01); *B23B 2222/04* (2013.01); *B24B 9/04* (2013.01)

(56) References Cited

U.S. PATENT DOCUMENTS

| | | | | |
|---|---|---|---|---|
| 3,215,287 | A * | 11/1965 | Bodan | B23B 13/00 414/18 |
| 3,557,646 | A * | 1/1971 | Agnew | B23B 5/28 407/8 |
| 3,566,722 | A * | 3/1971 | Audet | B23B 5/40 82/12 |
| 4,318,293 | A * | 3/1982 | Heymanns Lothar | B23B 31/16241 279/123 |
| 5,081,889 | A * | 1/1992 | Takano | B23B 5/02 82/122 |
| 6,502,834 | B1 * | 1/2003 | Fukui | B23B 31/201 279/156 |
| 7,770,499 | B2 * | 8/2010 | Biertz | B23Q 3/063 82/104 |
| 2015/0273588 | A1 * | 10/2015 | Bowen | B23B 5/28 82/104 |
| 2016/0158907 | A1 * | 6/2016 | Su | B23B 41/00 29/563 |

* cited by examiner

ALUMINUM WHEEL BURR REMOVING MACHINE

CROSS-REFERENCE TO RELATED APPLICATIONS

This application claims priority to Chinese Patent Application No. 201610818519.X, filed on Sep. 13, 2016, which is hereby incorporated by reference in its entirety.

TECHNICAL FIELD

The present invention relates to the field of wheel machining, specifically to an aluminum wheel burr removing machine.

BACKGROUND ART

After an aluminum alloy wheel blank is cast, burrs appear at the mould assembly position of the upper and lower rims; when internal inspection scanning is performed on an aluminum alloy wheel via an X-ray machine, the wheel burrs have great damage to the X-ray machine; meanwhile, the wheel burrs also have great influence on capture and alignment in the subsequent machining process. The wheel burrs are manually cut in the existing disposal method, so that much manpower is consumed, the efficiency is relatively low, and the burr cutting effect is not ideal. A burr removing machine can complete the burr cutting operation with high efficiency and high quality and reduce the manpower cost.

SUMMARY OF THE INVENTION

An aluminum wheel burr removing machine is comprises a roller bed device, a positioning and rotating device and a knife box device.

The positioning and rotating device includes a linear guide rail sliding block assembly A, a main frame, a right fixed plate, a cylinder A, clamping wheels, a driven shaft, shaft sleeves, a cog belt and belt pulley, a cylinder B, a stop shaft, a stop shaft seat, a driving shaft, a left movable plate, a motor seat and a motor. The driving shaft penetrates through the shaft sleeve, the motor is fixed on the left movable plate and the right fixed plate via the motor seat, the driven shaft penetrates through the shaft sleeve, the left movable plate is connected with the linear guide rail sliding block assembly A, the linear guide rail is connected with the main frame, the cylinder A drives the left movable plate and an upper connecting assembly to move horizontally via a guide rod so as to clamp a wheel, the motor is connected with the driving shaft to drive the clamping wheel to rotate, meanwhile, the motor drives the driven shaft and the clamping wheel to rotate synchronously via the cog belt and belt pulley, the clamping wheels finally drive the wheel to rotate, the stop shaft seat is connected with the left movable plate, the stop shaft penetrates through the center of the stop shaft seat, and the cylinder drives the stop shaft to move up and down.

The knife box device is composed of a knife box frame, a longitudinal knife holder and a knife box base.

The knife box frame includes a knife and knife holder, a left box plate, a cylinder C, a rear box plate, a longitudinal movable guide rail seat plate, a linear guide rail sliding block assembly B and a box welding plate. The knife and knife holder is fixed on the left box plate; the left box plate, the rear box plate and the box welding plate are connected with each other; the cylinder C is fixed on the rear box plate, a cylinder piston rod is connected with the longitudinal movable guide rail seat plate, and the longitudinal movable guide rail seat plate is connected with the rear box plate via the linear guide rail sliding block assembly B; and the cylinder piston rod drives the longitudinal knife holder to move up along the linear guide rail, so that a lower knife head cuts the bottom of the lower rim of the wheel.

The longitudinal knife holder includes a cylinder D, a transverse movable guide rail seat plate, a lower knife bar, a linear guide rail sliding block assembly C and a knife head. The cylinder D and the linear guide rail are fixed on the longitudinal movable guide rail seat plate, the transverse movable guide rail seat plate is connected with the linear guide rail sliding block assembly C and the cylinder D, the lower knife bar and the knife head are connected with the transverse movable guide rail seat plate, and the cylinder D drives the transverse movable guide rail seat plate, the lower knife bar and the knife head to feed along the linear guide rail, so as to longitudinally cut the lower rim of the wheel.

The knife box base includes a knife box movable seat plate, a linear guide rail sliding block assembly D, a cylinder E and a knife head holder. The knife box movable seat plate is connected with the linear guide rail sliding block assembly D and the cylinder E, the knife box movable seat plate is simultaneously connected with the box welding plate in the knife box frame, the linear guide rail sliding block assembly D is connected with the knife head holder, and the cylinder E drives the knife box movable seat plate, the knife and knife holder and the knife head to radially cut the upper and lower rims of the wheel.

The cylinder E drives the knife and knife holder to cut burrs on the upper rim of the wheel; the cylinder E and the cylinder D drive the knife head to radially cut the lower rim of the wheel; and the cylinder C drives the knife head to cut the bottom of the lower rim of the wheel.

The wheel is conveyed to a specified position by the roller bed device, the positioning and rotating device clamps and rotates the wheel, and the knife box device horizontally feeds to cut burrs of the wheel. After cutting, the cylinder B in the positioning and rotating device drives the stop shaft to rise higher than a roller bed surface, the cylinder A drives the left movable plate and the upper connecting assembly to loosen the wheel, the stop shaft drives the wheel to move to an opening position axially along a roller, the cylinder B drives the stop shaft to decline lower than the roller bed surface, the roller bed device conveys the wheel to next station, meanwhile, next wheel enters the roller bed device, and next cutting cycle is carried out.

The aluminum wheel burr removing machine of the present invention can remove burrs of wheel blanks with high quality and high efficiency and reduce the manpower cost.

BRIEF DESCRIPTION OF DRAWINGS

In figures: 1—roller bed device, 2—positioning and rotating device, 3—knife box device, 4—wheel, 201—linear guide rail sliding block assembly A, 202—main frame, 203—right fixed plate, 204—cylinder A, 205—clamping wheel, 206—driven shaft, 207—shaft sleeve, 208—cog belt and belt pulley, 209—cylinder B, 210—stop shaft, 211—stop shaft seat, 212—driving shaft, 213—left movable plate, 214—motor seat, 215—motor, 31—knife box frame, 311—knife and knife holder, 312—left box plate, 313—cylinder C, 314—rear box plate, 315—longitudinal movable guide rail seat plate, 316—linear guide rail sliding block assembly B, 317—box welding plate, 32—longitudinal knife holder, 321—cylinder D, 322—transverse movable guide rail seat plate, 323—lower knife bar, 324—linear guide rail sliding block assembly C, 325—knife head, 33—knife box base, 331—knife box movable seat plate, 332—linear guide rail sliding block assembly D, 333—cylinder E, 334—knife head holder.

DETAILED DESCRIPTION OF THE INVENTION

Figure 1:
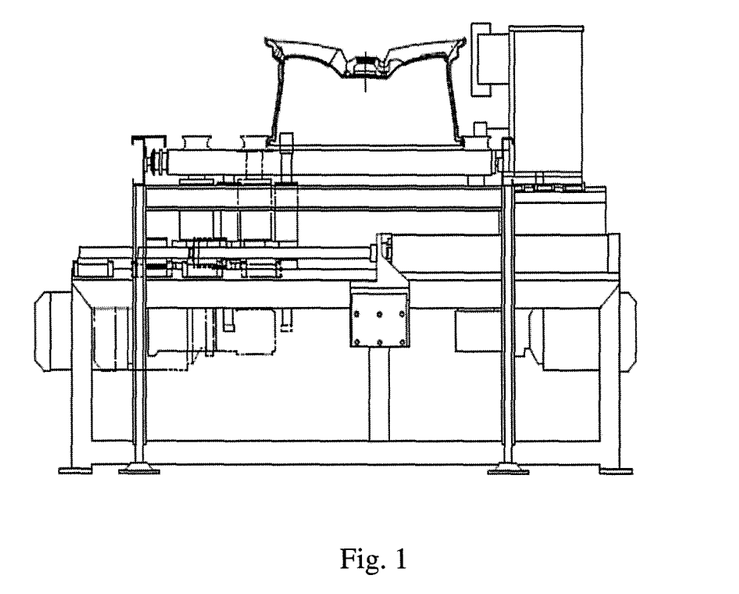
FIG. 1 is a front view of an aluminum wheel burr removing machine of the present invention.
Figure 2:
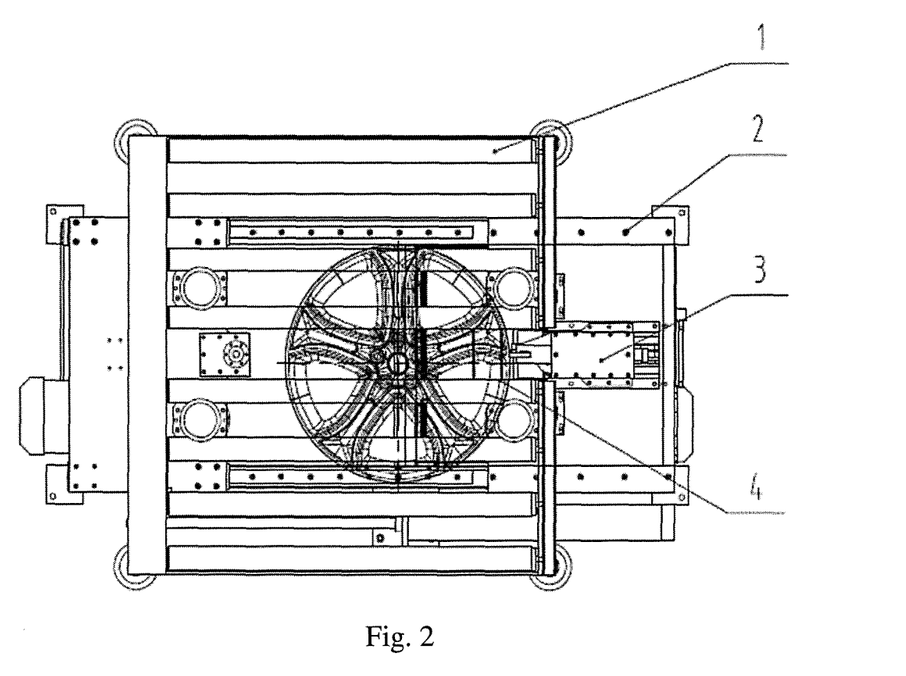
FIG. 2 is a top view of the aluminum wheel burr removing machine of the present invention.

An aluminum wheel burr removing machine of the present invention comprises a roller bed device 1, a positioning and rotating device 2 and a knife box device 3.

Figure 3:
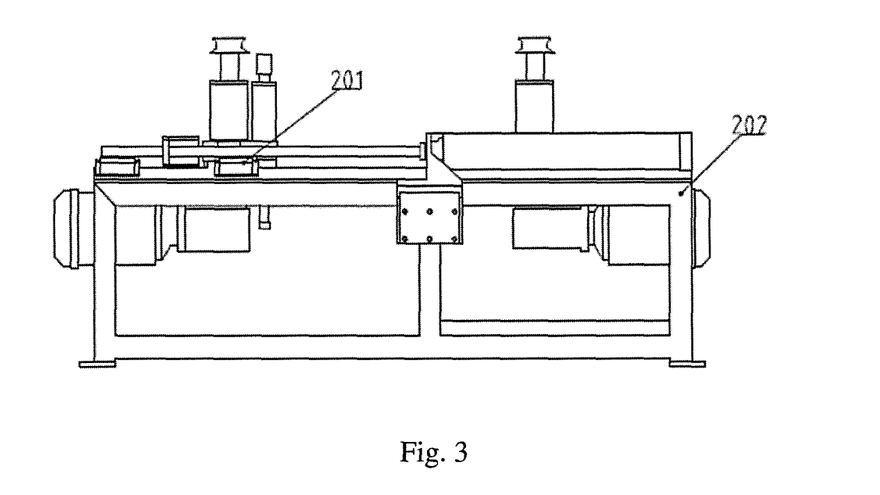
FIG. 3 is a front view of a positioning and rotating device of the aluminum wheel burr removing machine of the present invention.
Figure 4:
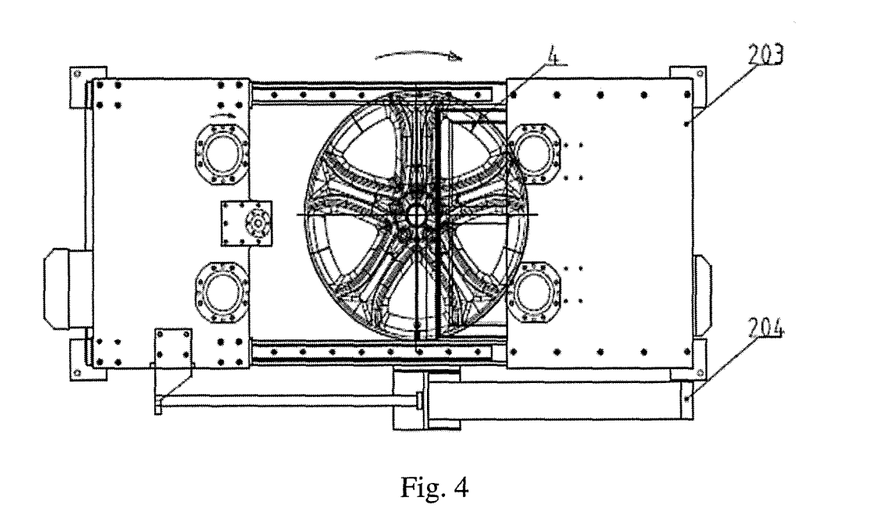
FIG. 4 is a top view of the positioning and rotating device of the aluminum wheel burr removing machine of the present invention.
Figure 5:
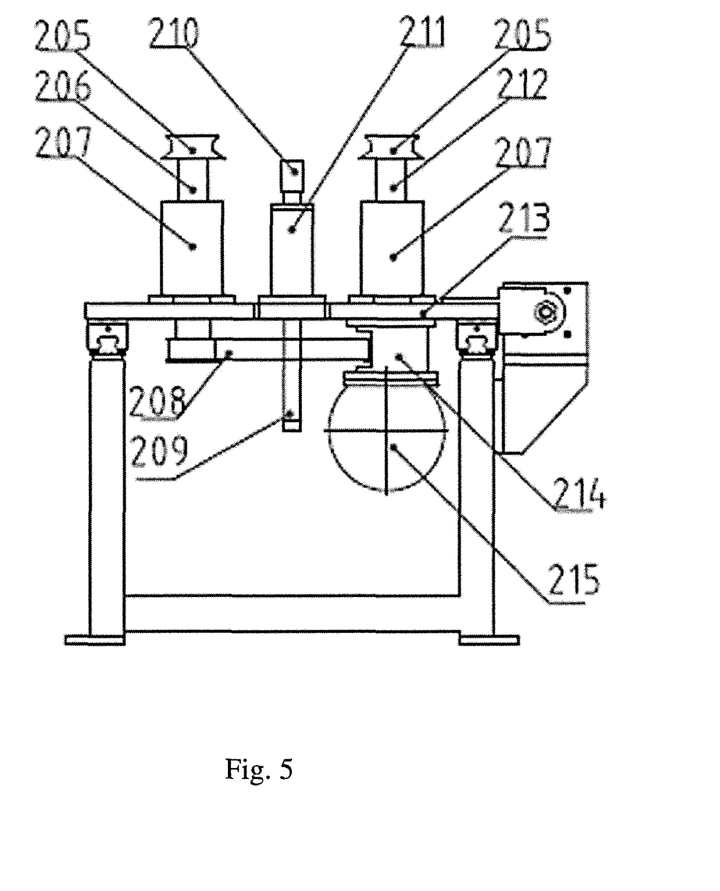
FIG. 5 is a side view of the positioning and rotating device of the aluminum wheel burr removing machine of the present invention.

A The positioning and rotating device 2 includes a linear guide rail sliding block assembly A 201, a main frame 202, a right fixed plate 203, a cylinder A 204, clamping wheels 205, a driven shaft 206, shaft sleeves 207, a cog belt and belt pulley 208, a cylinder B 209, a stop shaft 210, a stop shaft seat 211, a driving shaft 212, a left movable plate 213, a motor seat 214 and a motor 215.

The driving shaft 212 penetrates through the shaft sleeve 207, the motor 215 is fixed on the left movable plate 213 and the right fixed plate 203 via the motor seat 214, the driven shaft 206 penetrates through the shaft sleeve 207, the left movable plate 213 is connected with the linear guide rail sliding block assembly A 201, the linear guide rail sliding block assembly A 201 is fixed with the main frame 202, the cylinder A 204 drives the left movable plate 213 and an upper connecting assembly to move horizontally via a guide rod so as to clamp a wheel 4, the motor 215 is connected with the driving shaft 212 to drive the clamping wheel 205 to rotate, meanwhile, the motor 215 drives the driven shaft 206 and the clamping wheel 205 to rotate synchronously via the cog belt and belt pulley 208, the clamping wheels 205 finally drive the wheel 4 to rotate, the stop shaft seat 211 is connected with the left movable plate 213, the stop shaft 210 penetrates through the center of the stop shaft seat 211, and the cylinder 209 drives the stop shaft 210 to move up and down.

Figure 6:
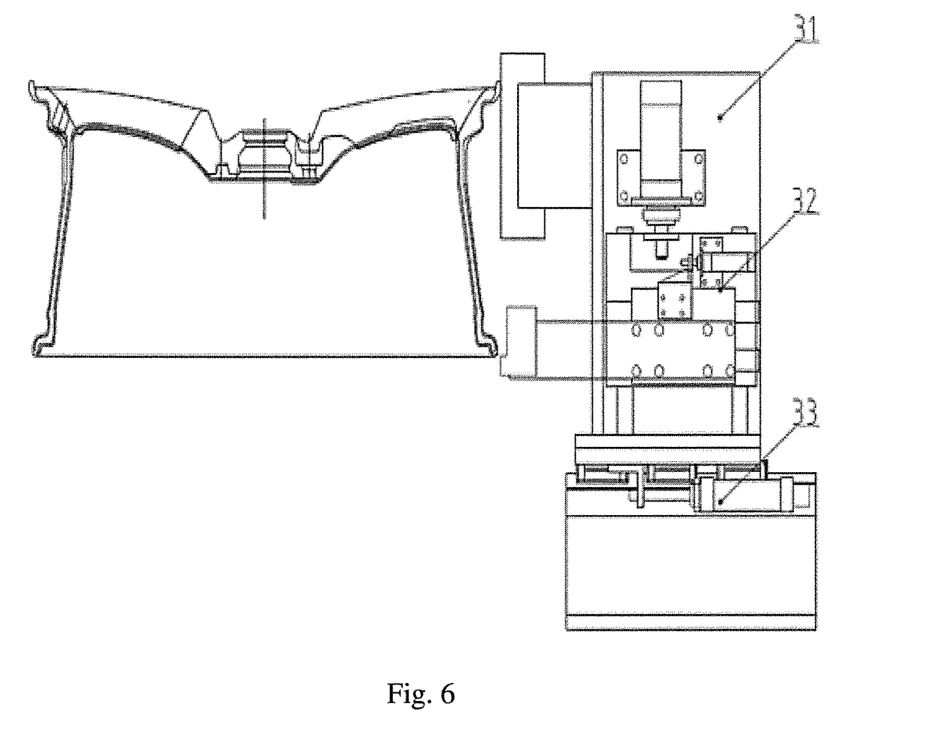
FIG. 6 is a front view of a knife box device of the aluminum wheel burr removing machine of the present invention.

The knife box device is composed of a knife box frame 31, a longitudinal knife holder 32 and a knife box base 33.

Figure 7:
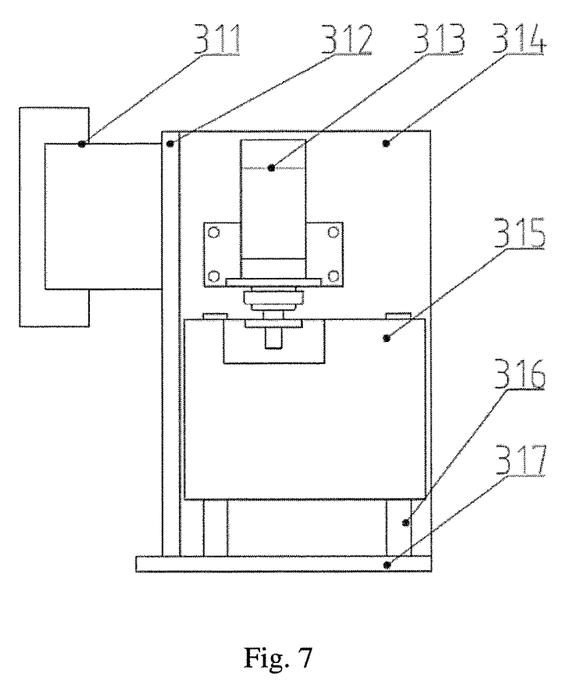
FIG. 7 is a schematic diagram of a knife box frame in the knife box device of the aluminum wheel burr removing machine of the present invention.

The knife box frame includes a knife and knife holder 311, a left box plate 312, a cylinder C 313, a rear box plate 314, a longitudinal movable guide rail seat plate 315, a linear guide rail sliding block assembly B 316 and a box welding plate 317. The knife and knife holder 311 is fixed on the left box plate 312; the left box plate 312, the rear box plate 314 and the box welding plate 317 are connected with each other; the cylinder C 313 is fixed on the rear box plate 314, a cylinder piston rod 313 is connected with the longitudinal movable guide rail seat plate 315, and the longitudinal movable guide rail seat plate 315 is connected with the rear box plate 314 via the linear guide rail sliding block assembly B 316; and the cylinder piston rod 313 drives the longitudinal knife holder 32 to move up along the linear guide rail 315, so that a lower knife head 325 cuts the bottom of the lower rim of the wheel.

Figure 8:
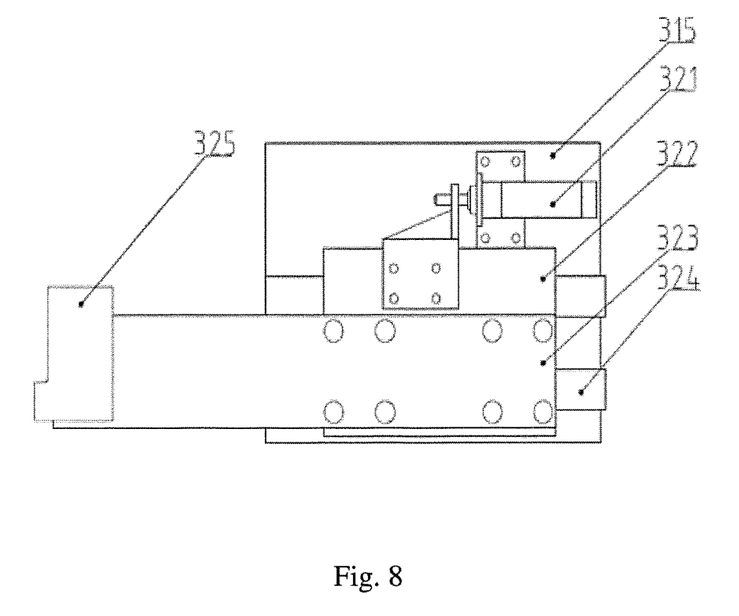
FIG. 8 is a schematic diagram of a longitudinal knife holder in the knife box device of the aluminum wheel burr removing machine of the present invention.

The longitudinal knife holder includes a cylinder D 321, a transverse movable guide rail seat plate 322, a lower knife bar 323, a linear guide rail sliding block assembly C 324 and a knife head 325. The cylinder D 321 and the linear guide rail 324 are fixed on the longitudinal movable guide rail seat plate 315, the transverse movable guide rail seat plate 322 is connected with the linear guide rail sliding block assembly C 324 and the cylinder D 321, the lower knife bar 323 and the knife head 325 are connected with the transverse movable guide rail seat plate 322, and a cylinder lever D 321 drives the transverse movable guide rail seat plate 322, the lower knife bar 323 and the knife head 325 to feed along the linear guide rail 324, so as to longitudinally cut the lower rim of the wheel.

Figure 9:
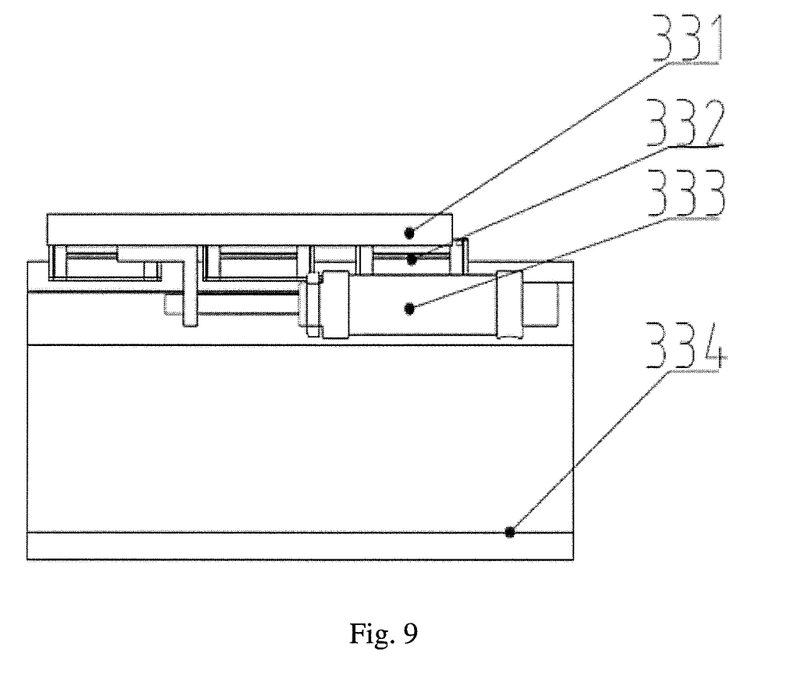
FIG. 9 is a schematic diagram of a knife box base in the knife box device of the aluminum wheel burr removing machine of the present invention.

The knife box base includes a knife box movable seat plate 331, a linear guide rail sliding block assembly D 332, a cylinder E 333 and a knife head holder 334. The knife box movable seat plate 331 is connected with the linear guide rail sliding block assembly D 332 and the cylinder E 333, the knife box movable seat plate 331 is simultaneously connected with the box welding plate 317 in the knife box frame 31, the linear guide rail sliding block assembly D 332 is connected with the knife head holder 334, and the guide rod of cylinder E 333 drives the knife box movable seat plate 331, the knife and knife holder 311 and the knife head 325 to radially cut the upper and lower rims of the wheel.

The cylinder E 333 drives the knife and knife holder 311 to cut burrs on the upper rim of the wheel; the cylinder E 333 and the cylinder D 321 drive the knife head 325 to radially cut the lower rim of the wheel; and the cylinder C 313 drives the knife head to cut the bottom of the lower rim of the wheel.

The wheel 4 is conveyed to a specified position by the roller bed device 1, the positioning and rotating mechanism 2 clamps and rotates the wheel 4, and the knife box device 3 horizontally feeds to cut burrs of the wheel 4. After cutting, the cylinder B 209 in the positioning and rotating mechanism 2 drives the stop shaft 210 to rise higher than a roller bed surface, the cylinder A 204 drives the left movable plate 213 and the upper connecting assembly via the guide rod to loosen the wheel, the stop shaft 210 drives the wheel 4 to move to an opening position axially along a roller, the cylinder B 209 drives the stop shaft 210 to decline lower than the roller bed surface, the roller bed device 1 conveys the wheel to next station, meanwhile, next wheel enters the roller bed device 1, and next cutting cycle is carried out.

In conclusion, the machining time of the aluminum wheel burr removing machine of the present invention is 25-30 seconds, so that the manpower cost is reduced, the machining efficiency is improved, and positive effects are achieved in burr removal of the wheel.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An aluminum wheel burr removing machine comprising a roller bed device, a positioning and rotating device and a knife box device, wherein
    the roller bed device is configured to convey a wheel to a specified position;
    the positioning and rotating device comprises a linear guide rail sliding block assembly A, a main frame, a right fixed plate, a cylinder A, clamping wheels, a driven shaft, shaft sleeves, a cog belt and belt pulley, a cylinder B, a stop shaft, a stop shaft seat, a driving shaft, a left movable plate, a motor seat and a motor; the driving shaft penetrates through the shaft sleeve, the motor is fixed on the left movable plate and the right fixed plate via the motor seat the driven shaft penetrates through the shaft sleeve, the left movable plate is connected with the linear guide rail sliding block assembly A, the linear guide rail sliding block assembly A is fixed with the main frame, the cylinder A drives the left movable plate and an upper connecting assembly to move horizontally via a guide rod so as to clamp a wheel the motor is connected with the driving shaft to drive the clamping wheel to rotate, meanwhile, the motor drives the driven shaft and the clamping wheel to rotate synchronously via the cog belt and belt pulley, the clamping wheels finally drive the wheel to rotate, the stop shaft seat is connected with the left movable plate, the stop shaft penetrates through the center of the stop shaft seat, and the cylinder drives the stop shaft to move up and down;
    the knife box device is composed of a knife box frame, a longitudinal knife holder and a knife box base;
    the knife box frame comprises a knife and knife holder, a left box plate, a cylinder C, a rear box plate, a longitudinal movable guide rail seat plate, a linear guide rail sliding block assembly B and a box welding plate; the knife and knife holder is fixed on the left box plate; the left box plate, the rear box plate and the box welding plate are connected with each other;
    the cylinder C is fixed on the rear box plate, the cylinder piston rod is connected with the longitudinal movable guide rail seat plate, and the longitudinal movable guide rail seat plate is connected with the rear box plate via the linear guide rail sliding block assembly B;
    the longitudinal knife holder comprises a cylinder D, a transverse movable guide rail seat plate, a lower knife bar, a linear guide rail sliding block assembly C and a knife head; the cylinder D and the linear guide rail are fixed on the longitudinal movable guide rail seat plate, the cylinder piston rod drives the longitudinal knife holder to move up along the linear guide rail via the longitudinal movable guide rail seat plate, so that a lower knife head cuts the bottom of the lower rim of the wheel; the transverse movable guide rail seat plate is connected with the linear guide rail sliding block assembly C and the cylinder D, the lower knife bar and the knife head are connected with the transverse movable guide rail seat plate, and the cylinder lever D drives the transverse movable guide rail seat plate, the lower knife bar and the knife head to feed along the linear guide rail, so as to longitudinally cut the lower rim of the wheel;
    the knife box base comprises a knife box movable seat plate, a linear guide rail sliding block assembly D, a cylinder E and a knife head holder; the knife box movable seat plate is connected with the linear guide rail sliding block assembly D and the cylinder E, the knife box movable seat plate is simultaneously connected with the box welding plate in the knife box frame, the linear guide rail sliding block assembly D is connected with the knife head holder, and the guide rod of cylinder E drives the knife box movable seat plate, the knife and knife holder and the knife head to radially cut the upper and lower rims of the wheel;
    the cylinder E drives the knife and knife holder to cut burrs on the upper rim of the wheel; the cylinder E and the cylinder D drive the knife head to radially cut the lower rim of the wheel; and the cylinder C drives the knife head to cut the bottom of the lower rim of the wheel.

* * * * *